Oct. 3, 1939.   R. L. DAVISON   2,175,144
ELECTRICAL WIRING AND MOLDING SYSTEM
Filed July 29, 1933   2 Sheets-Sheet 1
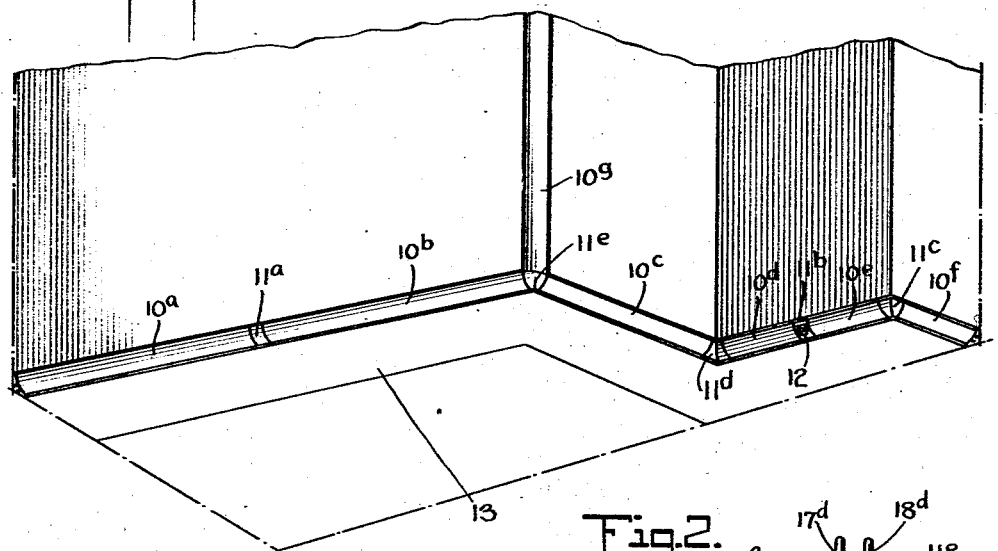
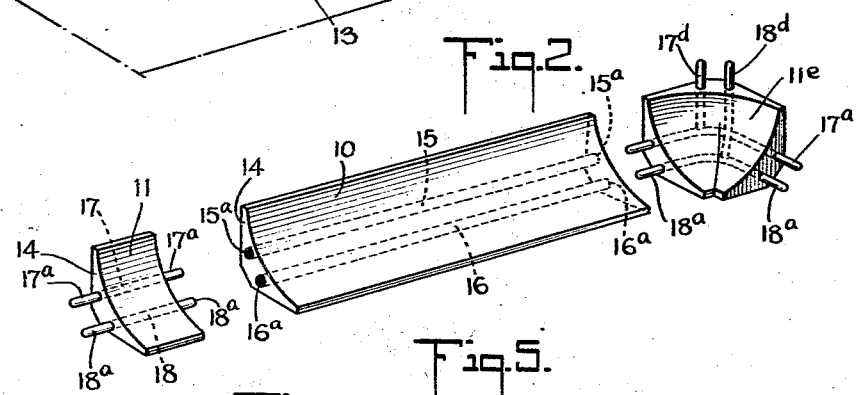
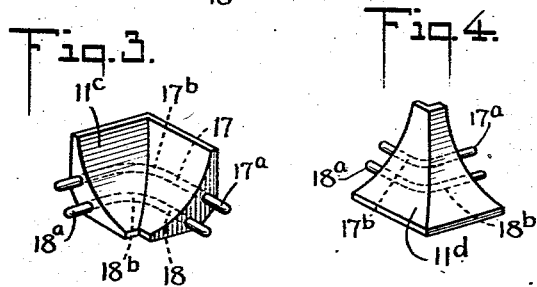
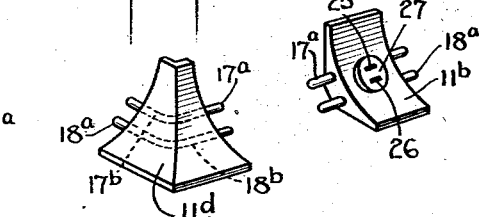
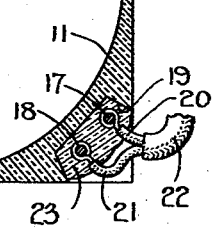
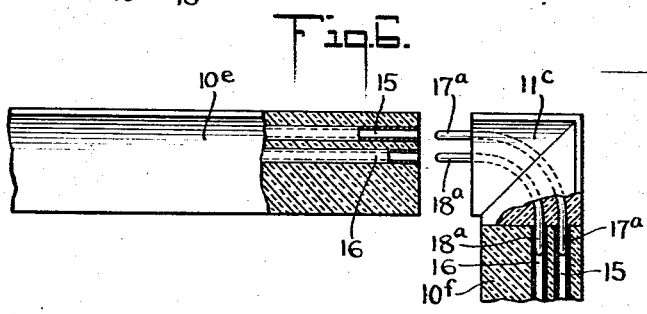
INVENTOR
Robert L. Davison
BY
HIS ATTORNEY

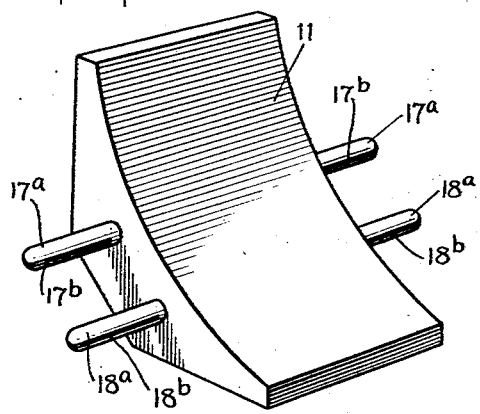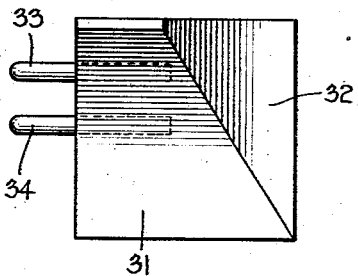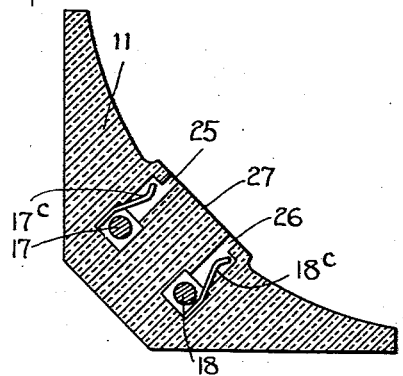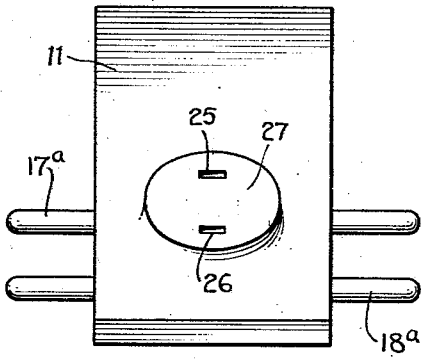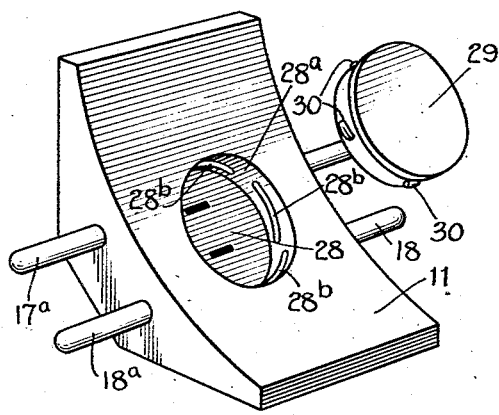

Patented Oct. 3, 1939

2,175,144

UNITED STATES PATENT OFFICE 2,175,144

ELECTRICAL WIRING AND MOLDING SYSTEM

Robert L. Davison, New York, N. Y., assignor to John B. Pierce Foundation, New York, N. Y., a corporation of New York Application July 29, 1933, Serial No. 682,757

4 Claims. (Cl. 173—334.1)

This invention relates to a system of combined electrical wiring and molding, serving the dual purposes of a finish for the structure of a room, enclosure and the like, as, for example, for the base board of a floor, the top of a floor base board, the picture molding, side wall and ceiling molding, etc., and also to house, insulate and protect electrical wiring.

This application is a continuation in part of my copending application Serial No. 643,325, filed November 19, 1932, entitled Combined molding and electric conductor.

A feature of my invention is the provision of relatively long units of combined electrical wiring and molding, the terminals of the conductors of which long units do not project at each end, and advantageously substantially flush at both ends of each such unit, such terminals being of a suitable socketed type, in association with units of relatively short length, the terminals of the conductors of which project at both ends, the units of short length serving to interconnect, that is, to couple, the units of long length, the conductors of the respective units being spaced and dimensioned relative to one another when thus coupled end to end, in carrying out the above stated purposes.

The exposed faces of the material serving as the body of the molding is preferably imperforate, and the configuration and dimensional outline of the long and short units are preferably identical, for the purpose of identity of appearance and for artistic effects.

My system of combined molding and electrical wiring embodies the use of a plurality of different types of units, the combined component parts when assembled in specific installations serving as a molding or trim for all purposes for which molding and trim are employed in the construction of rooms and other enclosures, as well as for exterior use of houses and other buildings, structures in general, etc.

By the utilization of my invention, such molding or trim embodies electrical conductors, and provision is made for locating as desired or required outlets for the supply of electrical current for general uses of the same, such as the usual consumption devices, i.e., electric lamps, electric clocks, electric irons, radios, electric refrigerators, electrical dish washers, electrical washers and other laundering machines, and the like, the general desideratum being to avoid lengths of cable or other wiring for such consumption devices, most usually lying on floors, extending over or about furniture and the like, and otherwise obstructing free passage, collecting dirt, and introducing fire and other hazards, and to avoid BX and other conduit connections, etc.

The relatively long units may be standardized, say for three, four, five, etc. feet. The short units may advantageously be of uniform length. The short units may, or may not, have an outlet as for example serving to connect with a plug leading to any desired electrical consumption device.

Pursuant to my system the outlet-provided unit or units are located closely adjacent the respective locations of the consumption devices, to afford electrical connection by short cable or wires.

In the circumstance of a change of location of the consumption device, the molding or trim is mechanically disconnected, observing the precaution of de-energizing the conductors, and the outlet-provided unit installed at the desired new location, the principle of my system being carried out in the installation of the same.

Certain types of the short units of like general nature are employed for interconnecting long units about corners. Such corner units may be 90°, 45° or other standard or other angular relationship, and may have converging or diverging facial relationship.

A primary characteristic of the system of the present invention resides in the use of hollow conductors for the long units, primarily for affording a socket connection at each end of such long units, the termini of both conductors at both ends of each long unit being substantially flush, that is to say, not projecting, relative to the face of each unit end. Advantageously, the conductors of the long units may be tubes of copper or other good electrically conducting material of proper bore.

The commercialization of my invention contemplates the manufacture of the short units of suitable moldable material, the relatively small dimensions of such short units enabling such manufacture to be carried out at low material and labor costs.

Coordinated with such long units, the short units, inclusive of rectilinear units, corner units, etc. embody conductors, which advantageously may be rods of copper or other good electrical conducting material of proper outside diameter or diameters. Preferably, the terminal portions of each end of the conductors of the short units are bifurcated or otherwise slotted, to provide laterally effective resiliency in insuring good electrical connection by mere frictional engagement with the hollow termini of the conductors of the long units.

In realization of the advantages of low cost of production and installation, commercial embodiments of my invention are had by forming substantially the entirety of the body of the long and short units—excepting of course the enclosed conductors—of insulating material.

By properly assembling such coordinated long and short units of my system in the specific installations, any desired combined molding and wiring is most readily had by ordering or having in stock standard or other lengths of the long units and a supply of the various required types of short units. In any given installation, the molding is built up by the stated principle of assembly of such standard long units as may be available, any length less than a standard length being had by the use of a saw or other suitable severing tool, since a mere sawing operation attains the desideratum of having the termini of the hollow conductors substantially flush with the sawed face of the unit.

Therefore:

An object of the invention is to provide a construction of molding which carries and suitably insulates the conductors serving as the electrical wiring.

An object of the invention is to provide a combined molding and electrical wiring system of units, the exposed faces of such units being imperforate, the configuration of the exposed faces of the component units being preferably unbroken and substantially identical, the units being assembled relative to one another to attain the effect of substantial integrality.

An object of the invention is the provision of a combined molding and electric wiring system, the electrical conductors, notably the "hot" conductor, being disposed inaccessible to unauthorized persons.

Further features and objects of the invention will be more fully understood from the following detail description and the accompanying drawings, in which Fig. 1 is a perspective view of a portion of a room or other enclosure, illustrating a commercial application of a preferred form of my invention;

Fig. 2 is a perspective exploded view of an assembly of component units, namely, a rectilinear interconnecting unit, a longitudinal unit and a corner interconnecting unit, corresponding generally to Fig. 1;

Fig. 3 is a perspective view of one type of corner interconnecting unit;

Fig. 4 is a perspective view of the rear of Fig. 3;

Fig. 5 is a perspective view of another type of rectilinear interconnecting unit, the same being provided with an outlet;

Fig. 6 is a plan view, partially in section, illustrating a manner of interconnecting a corner unit with two longitudinal units;

Fig. 7 is a vertical sectional view through a rectilinear interconnecting unit, illustrating particularly, one manner of electrically connecting the conductors to a house supply or other power circuit;

Fig. 8 is a perspective view on an enlarged scale of a short unit, the projecting termini of its conductors being slitted for resiliency effect;

Figs. 9 and 10 are respectively a vertical sectional view and a front elevation of an outlet-provided short unit;

Fig. 11 is a perspective view of a type of short unit provided with an outlet having a countersunk face and one form of closure cap, for concealing and protecting the outlet parts;

Fig. 12 is a front elevational view of an end unit.

The installation illustrated in Fig. 1 indicates one manner of component assembly of my combined molding and wiring system at one side of a room shown as having two right-angled corners. It will be understood that my system is flexible in application of selection of standard or other lengths of the long units.

As illustrated in Fig. 1, the long units are indicated at $10a$, $10b$, $10c$, $10d$, $10e$, $10f$, etc. A short unit is indicated at $11a$; the short unit in this instance is not provided with an outlet. Another short unit is indicated at $11b$, which, in this instance, is provided with an outlet indicated at $12$.

A converging corner short unit shown in Fig. 1, is indicated at $11c$. A diverging corner short unit is indicated in Fig. 1 at $11d$.

At $11e$ is indicated another type of corner unit, which in this instance incidentally is of the converging type; a characteristic of the unit $11e$ is its provision of suitable means for connection with a vertically extending long unit $10g$.

In the instances illustrated in Fig. 1, the respective units serve as component parts of a molding applied at the top edges of a floor board $13$. Molding serving as picture molding, formed of component parts and utilized in a similar manner, and correspondingly molding applied at the intersecting faces of walls and ceiling, between mantle and wall, etc., are built up and applied in corresponding manner.

As appears, the exposed faces of the molding are imperforate excepting for the desired outlet or outlets, such imperforate feature serving to protect the conductors from exposure to and accumulation of soap-containing and other cleaning fluids, dirt and other foreign matter, protection from children and other unauthorized persons, etc. Desirably from the view point of artisticness, the exposed faces of the component units may be of the same configuration, color, etc. as desired.

As illustrated in Fig. 2, the material of the body $14$ of the indicated long unit $10$ is homogeneous, in which instance any suitable electrically insulating material may be employed. The process of forming such body $14$ by molding, extruding, etc. may be carried out as preferred.

The unit $10$ illustrated in Fig. 2 corresponds to the units $10a$, $10b$, $10c$, etc. indicated in Fig. 1.

The conductors $15$, $16$ of the long unit $10$ are preferably hollow tubing; their respective ends $15a$, $15a$ and $16a$, $16a$, that is to say, at both ends of each long unit $10$ are substantially flush with the faces of the material $14$. In such illustrated embodiment of my invention, substantially the entirety of the body of each long unit is formed of the electrically insulating material $14$, which encloses and retains in proper relative position the conductors $15$, $16$.

For the purpose of identifying the respective conductors $15$, $16$, the internal, i. e. effective diameters, of the same may be of different bore; as, for example, the "hot wire", say $15$, may be of larger bore than the grounded "wire" $16$.

For systems requiring three "wires", provision is had in like manner, and similarly for any larger plurality of "wires", in the respective embodiments of my invention, and the units thereof.

If desired, the bores may be uniform or of different diameters.

The short unit 11 illustrated in Fig. 2 corresponds to the short unit 11a indicated in Fig. 1.

An essential of a short unit 11, as distinguished from a long unit 10, is that its conductors 17, 18, have their respective ends 17a, 17a, and 18a, 18a, projecting at both ends of the unit 11, the termini 17a, 17a and 18a, 18a being of appropriate diameter or diameters for register with and to effect good electrical contact with a set of correspondingly located termini 15a and 16a of the said hollow tube conductors 15, 16.

As indicated in Fig. 2, the material of the body 14 of the short unit 11 is homogeneous, and may be the same as the material 14 of the long unit 10.

Power is applied to the resulting electrical wiring component units as preferred. Advantageously, as is indicated in Fig. 7, electrical connection may be had with the house wiring system or other power line wires, through the instrumentality of a short unit 11, which type of short unit is provided with a recess 19, desirably at its rear, in which recess the conductors 17, 18 are wholly or partially exposed, affording mechanical and electrical connection, preferably including soldering, of the bared ends of the indicated conductors 20, 21 of a cable 22 leading from or connected to the electrical source. The securement and protection of such electrical connection is enhanced by the use of any suitable plastic electrically insulating material, indicated at 23. If desired, the short units of all types may be provided with such rearwardly disposed recess 19, or if preferred such connection affording recess may be provided by a selected or definite type of short and/or long unit.

Preferably, the termini of the conductors 17a, 17a and 18a and 18a are of resilient formation, had, for example, by longitudinal slitting of the same, as is indicated in Fig. 8. Under certain circumstances, it is preferred to arrange the slitting, see 17b, 17b and 18b, 18b, Fig. 8, to lie in planes substantially parallel to a mean plane of the main exposed face of the unit; in the instance of the illustrated unit, see Fig. 8, such main exposed face is slightly arcuate, its mean plane extending approximately at a 45° angle to the vertical.

As above indicated, the short unit is furnished of the type embodying an outlet, to afford connection with a plug, or equivalent, of a cable or other electrical wiring leading to the lamp, clock, iron, radio, refrigerator, or other electrical device, the cable or other electrical connection advantageously being of reduced length. Any suitable form of outlet may be employed.

A suitable form of outlet is indicated in Figs. 9 and 10, which in essence comprises the spring or other suitable terminal or contact members 17c, 18c, being suitably secured to the respective conductors 17, 18 and extending upwardly in the recesses 25, 26. The exposed face 27 of the outlet is substantially flat, for engagement thereat of the usual flat face of a plug or equivalent.

As illustrated in Figs. 9 and 10, the face 27 may be located beyond the outline of the arcuate or other exposed face of the short unit 11.

Such outlet-provided short unit may be constructed to effect concealment of its terminal openings, to thereby present a substantially imperforate face coincident with the exposed face of the unit, and also to preclude accumulation of dirt and the like, and to shed cleansing fluid as when washing the molding with soap-containing or other cleansing fluid; such construction also obviates tampering with the electrical conductors.

As one form of such arrangement, I have illustrated in Fig. 11, an outlet, the face 28 of which is countersunk relative to the exposed face of the unit 11, and a cap 29 for closing the resulting countersunk recess 28a when the outlet is not in use. Such closure cap may be removably locked in position. As one form of locking, I may provide the lugs 30, projecting from the cylindrical face of the cap 29. the respective lugs, upon application and partial turning of the cap 29 within the recess 28a, being received in the partial screw-threaded locking ridges 28b. The exposed face of the cap 29 is desirably contoured to conform to the exposed face of the unit 11.

The convergent type of short unit indicated in Fig. 3 and the divergent type of short unit indicated in Fig. 4 correspond to the constructions of the general type of short unit 11, illustrated in Fig. 2, and like parts are designated by like reference characters. In the illustrated two types of short units, shown in Figs. 3 and 4, the conductors 17, 18 are bent, preferably curved as indicated at 17b, 18b, respectively, to conform to the angle of the unit, in these two instances at substantially a right angle; it is to be understood that in angular units embodying angles other than a right angle, the conductors 17, 18 are bent or curved correspondingly.

Fig. 6 illustrates, on an enlarged scale, the component assembly of a long unit, say 10e, see also Fig. 1, interconnected to the long unit 10f by a converging short unit 11c, the closure of the connection of the projecting terminals 17a, 18a with the hollow terminals of the conductors 15, 16, respectively, of the long unit 10f being indicated as completed, whereas the interconnection of the opposite projecting terminals 17a, 18a with the hollow terminals of the conductors 15, 16 respectively, of the long unit 10e is illustrated as in course of assembly.

Supplemental units embodying my invention, for carrying out detail wiring requirements will be apparent, from the herein disclosure. Thus for extending the wiring system vertically, as for example in a corner between two walls, a unit such as the unit 11e is provided. The unit 11e corresponds in major construction to the unit 11c, see Fig. 2, and also Fig. 1, and like parts are designated by like reference characters. In addition, the unit 11e comprises the vertically extending conductors 17d, 18d respectively suitably connected to the horizontally extending conductors 17, 18. In corresponding manner, other forms of short and/or long units are arranged to provide for additional molding and/or wiring requirements.

Preferably, the "blind" end of a "run" of combined molding-wiring is finished by the employment of a type of short unit mechanically interlocked with its adjoining unit and serving to conceal and protect the terminals of the adjoining unit. One form of such end unit 31 is illustrated in Fig. 12, the body and facial configuration conforming to that of the remaining units of the system, excepting in the preferable form the provision of a suitably contoured face 32, serving as an appropriate finish face. The unit 31 is shown provided with terminals 33, 34, which advantageously but not necessarily may be of metal.

The respective units of my combined molding and wiring system are secured in position in any suitable manner customary in the trade.

As appears hereinabove, and as is phrased in the claims, I define the term "short unit" as a unit having appropriate configuration for a molding, trim or the like, and embodying rods or other suitable conductors of electrically conducting material having end terminals which project at each effective end of such unit for engagement with the hollow termini of the conductors of the adjacent long unit or units. Accordingly, a characteristic of each long unit is that its conductors are hollow at its ends, preferably tubular throughout its length, to afford severing of the unit for any desired length inclusive of severing each conductor to locate its terminus substantially flush—essentially not projecting—relative to each end of the long unit.

From the above, it appears that preferred embodiments of the long units and the two types of short units, that is, one type provided with outlet means and the other type not provided with outlet means, comprise insulation within the body of each such unit wholly embracing the respective conductors of such unit, and that such insulation extends integrally from conductor to conductor of each unit. Further, the exposed faces of preferred embodiments of each long unit and of each of the two types of short units are substantially identical in facial contour to effect, when coupled end to end as above pointed out, visual continuity from end to end of the resulting molding and wiring system.

My invention in its respective embodiments is also applicable to combined trim and wiring systems for factories, and also for automobiles, aeroplanes, etc., for lighting, power, etc., as well as general transmission of electrical energy to the desired locations of use.

I claim:

1. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units being substantially identical in facial contour to effect visual continuity when assembled.

2. A combined molding and electrical wiring system comprising alternately assembled long and short conductor carrying units composed entirely of insulating material, and adapted to serve as a building molding, said short units serving as couplings for the long units, the conductors of said long units and said short units being in continuous conductive relationship when the units are assembled end to end, the insulation within the body of each long unit and each short unit wholly embracing the respective conductors of such unit and integrally extending from conductor to conductor of such unit, the exposed faces of said long units and said short units having their lateral edges in rectilinear alignment to effect visual continuity when assembled.

3. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units having their lateral edges in rectilinear alignment to effect visual continuity when assembled.

4. A combined molding and electrical wiring system comprising alternately assembled long and short conductor carrying units composed entirely of insulating material, and adapted to serve as a building molding, said short units serving as couplings for the long units, the conductors of said long units and said short units being in continuous conductive relationship when the units are assembled end to end, the insulation within the body of each long unit and each short unit wholly embracing the respective conductors of such unit and integrally extending from conductor to conductor of such unit, the exposed faces of said long units and said short units having their lateral edges in rectilinear alignment to effect visual continuity when assembled, one of said short units being provided with an opening at an unexposed face to afford access to the respective conductors of such unit for effecting electrical connection with the service lines.

ROBERT L. DAVISON.